United States Patent [19]

Barney

[11] 4,257,894

[45] Mar. 24, 1981

[54] FILTER CORE EXTENDER AND SEAL

[75] Inventor: Marshall Barney, Columbus, Ohio

[73] Assignee: Celanese Corporation, New York, N.Y.

[21] Appl. No.: 957,123

[22] Filed: Nov. 2, 1978

[51] Int. Cl.³ .................. B01D 25/00; B01D 27/00
[52] U.S. Cl. ................................. 210/232; 55/483;
   55/492; 55/509; 210/322; 210/446; 210/455;
   210/463
[58] Field of Search ............... 55/482, 483, 492, 509;
   210/232, 322, 446, 449, 455, 457, 459, 460, 463,
   462; 285/397, 370, 371, 423; 156/73.5; 29/470.3

[56] References Cited

U.S. PATENT DOCUMENTS

| 205,709 | 7/1878 | Wells | 285/397 |
|---|---|---|---|
| 2,525,287 | 10/1950 | Cuno | 210/232 |
| 3,002,870 | 10/1961 | Belgarde et al. | 156/73.5 |
| 3,092,577 | 6/1963 | Sather | 210/232 |
| 3,547,719 | 12/1970 | Kasten | 156/73.5 |
| 3,633,757 | 1/1972 | Madern | 210/457 |
| 3,868,325 | 2/1975 | Otto | 210/232 |
| 3,870,636 | 3/1975 | Schettler | 210/232 |
| 3,934,906 | 1/1976 | Shippey et al. | 285/371 |
| 3,980,248 | 9/1976 | Minoshima | 156/73.5 |
| 3,992,045 | 11/1976 | Whittell et al. | 285/371 |
| 4,062,781 | 12/1977 | Strauss et al. | 210/455 |

OTHER PUBLICATIONS

"Exhibit A", see Prior Art Statement of 16 Jan., 1979, Paper No. 2, last page, second paragraph.

*Primary Examiner*—Frank Sever
*Attorney, Agent, or Firm*—John A. Shedden; Marvin Bressler; Thomas J. Morgan

[57] ABSTRACT

A core extender and seal are provided which may be used in combination with cartridge filters. The core extender includes a body having first and second ends which are connected by longitudinal communication means through the core extender body. A radially extending shoulder extends from the body and is axially spaced from at least one end of the body, and preferably is a flange having on at least one lateral surface thereof an annular sealing ring. An external surface extends from at least one end to the radially extending shoulder. The portion of the body defined by an external surface may be inserted into the longitudinal bore of the filter cartridge in order to perform a sealing and connecting function between adjacent filters or a cartridge filter and the filter housing. Adjacent cartridge filters may be connected and adjacent radial surfaces sealed from filtrate leakage by placing an annular sealing ring therebetween such that the peripheral edge of the ring is pressed into the end surface of each cartridge filter. The annular sealing ring has an inside diameter which is greater than the diameter of the bore of the cartridge filter while the outside diameter of the annular ring is less than the diameter of the cartridge filter. The annular sealing ring has a peripheral edge which is capable of being pressed into an end surface of a cartridge filter in order to seal adjacent radial surfaces of two cartridge filters.

8 Claims, 11 Drawing Figures

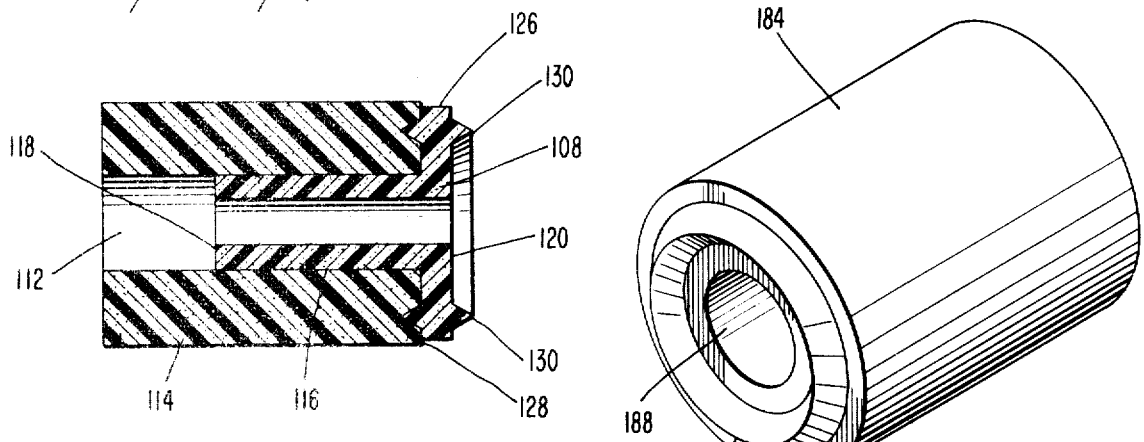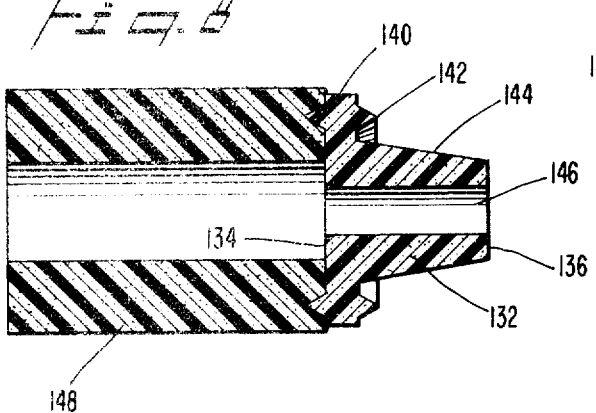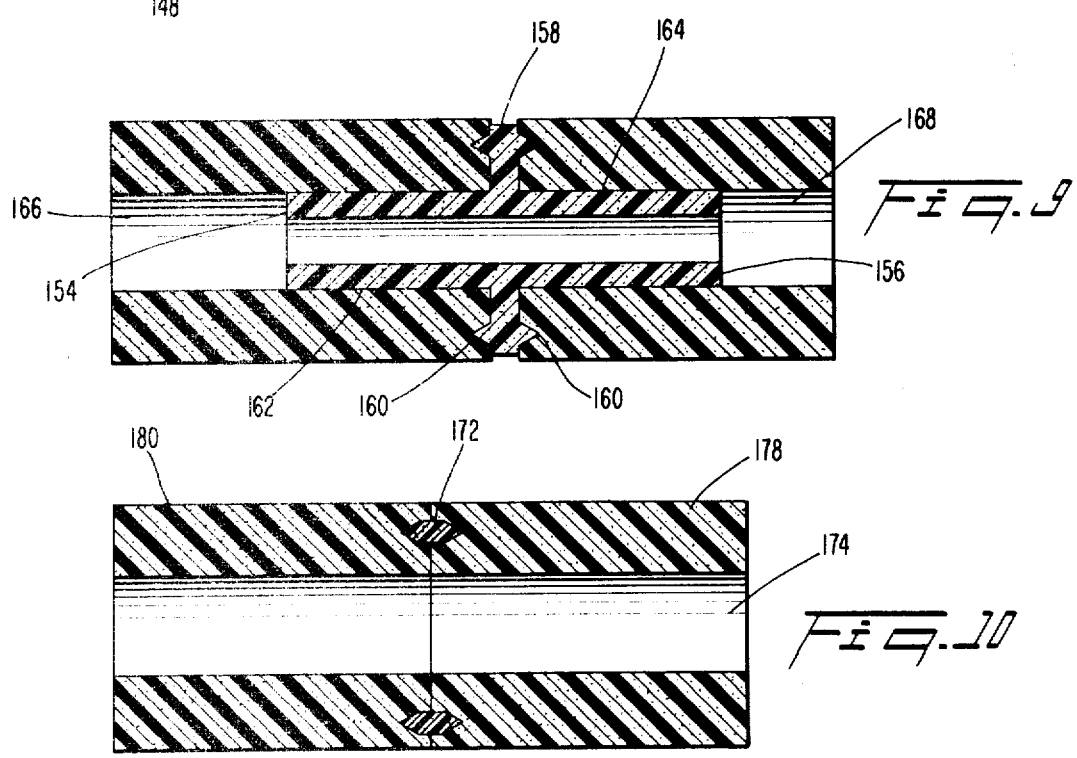

FILTER CORE EXTENDER AND SEAL

BACKGROUND OF THE INVENTION

This invention relates to filter units such as those commonly used in cylindrical filter assemblies. More specifically, this invention relates to integral filter core extenders and sealing devices which are used to provide connecting and sealing means between adjacent cartridge filters as well as to provide structural integrity to a plurality of adjacent cartridge filters.

Filtration is one of the most common operations conducted in conjunction with a multitude of industrial processes. Typically, suspended solids are removed from liquid streams in order to recover the solids as a product or to provide a filtered liquid product stream. Under certain conditions the filtration operation rapidly becomes ineffective due to the filter having reached its filtration capacity, thus requiring cleaning of the filter medium. In order to avoid time-consuming filter cleaning procedures, cartridge filters were introduced in order to provide for ease of filter replacement.

Typically, cartridge filters are stacked within a filter housing containing a support rod, often metal, that positions the filter cartidges. The support rod is inserted through the filter cartidges by way of longitudinal bores or cavities therein. One disadvantage with respect to the use of these support rods to position the cartridges is that the rods are frequently crushed when the filters fail due to overloading or excessive pressure drop. Additionally, even when the support rod does not fail, collapse of the filter onto said rod makes it extremely difficult to separate the rod from the filter medium for re-use. Replacement of the support rods is an expensive and time-consuming process.

In addition, a problem frequently arises concerning the prevention of leakage of liquid filtrate between adjacent annular surfaces of cartridge filters within a filter housing. It is difficult to provide a stacked coaxial assembly of cartridge filters which are pressed together in such a manner so as to prevent leakage of liquid through the adjacent annular surfaces.

It is thus an object of this invention to provide an improved means for positioning and supporting cartridge filters within a filter housing.

It is also an object of this invention to provide an improved means to connect adjacent filter cartridges within a filter housing.

A still further object of this invention is to provide an improved means to form a more effective seal between adjacent cartridge filters in a filter housing.

SUMMARY OF THE INVENTION

The foregoing and many other objects of this invention, it has been discovered, may be attained by a core extender for use with cartridge filters. The core extender includes a body having first and second ends with communication means extending longitudinally through said body between the ends. The communication means enables fluid to flow through the core extender body between the ends. A shoulder is axially spaced from one of the ends and extends radially from the body, with at least one external surface extending between at least one of the ends and the shoulder.

Additional advantages may be attained by a core extender body having first and second ends wherein a radially extending shoulder is in juxtaposition with the second end with an external surface extending between the first end and the shoulder.

The radially extending shoulder of the core extenders of this invention may be a flange-like member, and most advantageously have an annular sealing ring on at least one lateral surface thereof. The sealing ring has a peripheral edge which is capable of being pressed into the body of a cartridge filter.

Still further advantages may be attained by the use of an annular sealing ring in combination with a cartridge filter. The sealing ring is placed against at least one end surface of a cartridge filter whereby the peripheral edge of the sealing ring is pressed into the filter body and prevents filtrate from bypassing the intended flow through the longitudinal bores of the cartridge filters. The sealing ring has an inside diameter greater than the diameter of the bore of the filter and an outside diameter less than the diameter of the filter.

A stacked coaxial assembly of cartridge filters may be connected using either the core extenders or the sealing ring of this invention. The portion of the body of a core extender defined by an external surface may be inserted into the longitudinal bore of a first cartridge filter, with the radial shoulder regulating the depth of insertion. An adjacent cartridge filter may be seated upon a remaining portion of the core extender which protrudes from the first cartridge filter and is defined by a second external surface.

Core extenders which have a shoulder which is in juxtaposition with one of the ends of the core extender body may be attached to the end surface of the cartridge filter by a spin-welding process whereby the juxtaposed end is attached thereto. The longitudinal communication means of the core extender and the bore of the filter are aligned so that cooperation between the two may occur.

Similarly, adjacent cartridge filters may be connected and adjacent radial surfaces sealed from filtrate leakage by placing an annular sealing ring therebetween such that the peripheral edge of the ring is pressed into the end surface of each cartridge filter. Each cartridge filter may have one annular sealing ring attached to one end by suitable means (for example, by spin-welding) with respective end surfaces of the cartridge filters within a stacked coaxial assembly being joined together within a filter housing.

BRIEF DESCRIPTION OF THE DRAWINGS

FIG. 7 is a cross-sectional view of yet another embodiment of the tubular core extender of the present invention in combination with a filter cartridge;

FIG. 8 is a cross-sectional view of another embodiment of the tubular core extender of the present invention in combination with a filter cartridge;

FIG. 9 is a cross-sectional view of another embodiment of the tubular core extender of the present invention in combination with a filter cartridge;

FIG. 10 is a cross-sectional view of an annular sealing ring in combination with two cartridge filters; and FIG. 11 is a view in perspective of the annular sealing ring of FIG. 10 in combination with a filter cartridge.

DESCRIPTION OF THE PREFERRED EMBODIMENTS

An understanding of the invention may be obtained by reference to the illustrated embodiments as depicted by the drawings of FIGS. 1-11.

Figure 1:
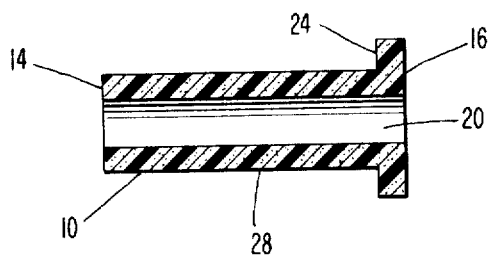
FIG. 1 is a cross-sectional view of one embodiment of the tubular core extender of the invention.

As depicted in FIG. 1, a cartridge filter core extender body 10 is shown. The core extender body has first and second ends 14, 16, respectively, with a communication means 20 extending longitudinally between the first and second ends 14, 16 for establishing fluid communication between the first and second ends. The communication means is a longitudinal bore or passage which may be of any suitable cross-sectional shape (e.g., circular or rectangular). A shoulder 24 extends generally radially from said core extender body and is juxtaposed with said second end. An external surface 28 extends between said radially extending shoulder 24 and said first end 14.

The external surface 28 may be of any suitable cross-sectional configuration which will allow the portion of the core extender body defined by said external surface to be inserted into the longitudinal bore of a filter cartridge. Generally, however, the longitudinal bore of a filter cartridge will be circular in cross section. Therefore, the cross-sectional configuration of the portion of the extender defined by the external surface 28 will similarly be circular and of a corresponding diameter so as to ensure a tight friction fit between the external surface and the surface of the longitudinal bore of the filter as the core extender is inserted into the bore of the filter cartridge. The tight friction fit is intended to prevent fluid leakage between the external surface of the core extender and the surface of the longitudinal bore of the filter. The external surface 28 may also be textured or roughened in order to enhance a sufficiently tight friction fit. Similarly, the core extender body 10 may have a barb or barbs extending from the surface 28 to aid in ensuring a sufficiently tight fit as shown in FIG. 12.

The radially extending shoulder 24 may be either of a relatively small radius (i.e., merely a projecting edge or rim) or of a relatively large radius (i.e., constituting a flange-like member). A criterion which must be satisfied is that the shoulder must extend far enough from the exterior surface 28 of the core extender 10 so as to seat itself against the end surface of a filter cartridge as the core extender is inserted therein in order to control the degree of insertion of the core extender into the filter bore.

Figure 2:
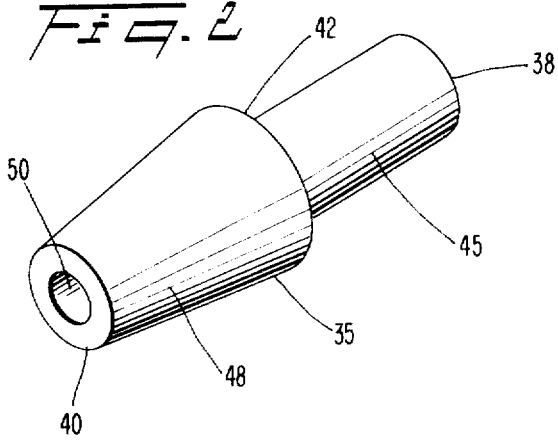
FIG. 2 is a view in perspective of an embodiment of the tubular core extender of this invention.

An additional external surface 48 has been added in FIG. 2 to the core extender of FIG. 1. Specifically, the core extender 35 has first and second ends 38,40, respectively. A radially extending shoulder 42 is positioned between said two ends. In addition, a first external surface 45 extends between the first end 38 and the shoulder 42, while a second external surface 48 extends from the shoulder to the second end 40. A longitudinal bore or passage 50 extends longitudinally through the body of the core extender.

As depicted in FIG. 2, the first external surface 45 is cylindrical, while the second external surface 48 is frustoconical, i.e., defines a frustum. However, both may by cylindrical, frustoconical, or any other configuration which allows for insertion of the core extender into a cartridge filter bore.

Figure 3:
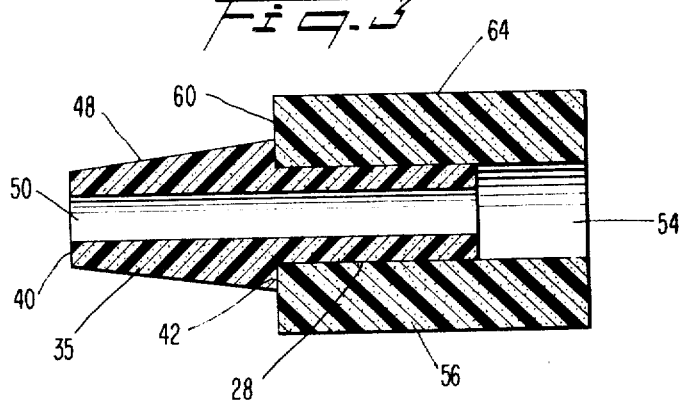
FIG. 3 is a cross-sectional view of the tubular core extender of FIG. 1 in combination with a filter cartridge.

The core extender body 35 as shown in FIG. 3 is inserted into the longitudinal bore 54 of a cartridge filter 56 resulting in a tight frictional fit therein. The shoulder 42 of the core extender abuts the end surface 60 of the cartridge filter.

Another cartridge filter may be positioned over and supported by the second external surface 48. In order to provide for ease of insertion of the second external surface portion of the core extender into a second cartridge filter, the cross-sectional diameter of the frustoconical surface nearest the second end 40 should be smaller than the inside diameter of the longitudinal cavity within the cartridge filter to be inserted thereon. Similarly, the cross-sectional diameter of the frustoconical surface nearest the shoulder 42 will be somewhat greater than the inside diameter of the longitudinal cavity within the cartridge filter to be inserted thereon to provide for an effective interference fit and sealing effect between the core extender and the cartridge filter.

In addition, the respective diameters of the various portions of the frustoconical portion of the core extender should be sized so as to also fit within the holes in the bottom of a conventional cartridge filter housing. The holes in the bottom of a housing usually result from the removal of the standpipe which was conventionally used to provide a guide and/or structural integrity for a series of stacked cartridge filters. This invention allows for the removal of the standpipe from the filter housing. Thus within a stacked coaxial assembly of filters wherein the cartridge filters are operably connected by way of the core extenders of the present invention, the bottom-most filter will be connected to the filtrate removal means by way of a core extender of said filter being seated within the hole vacated by the standpipe. The configuration of the frustoconical portion of the core extender which is seated into said hole should be such that a tight interference fit is obtained which will allow for efficient sealing and/or positioning of a filter or an assembly of filters. The seal against the bottom of the housing normally is effectuated by 1) the frustoconical extension; 2) the sharp edged annular ring (if one is on the flange); or 3) a raised annular section in the bottom of the housing itself.

The use of the core extenders of this invention is especially advantageous with cartridge filters which are not of a uniform cross-sectional density. Such filters will generally increase in density radially from the outermost surface toward the control bore and may be described as having a generally uniform density gradient toward the central bore of the filter. The increased density within the central portion enhances the structural integrity of the filter and the removal of the conventional standpipe from a filter housing does not cause major structural problems for such a stacked coaxial assembly of filters. The enhanced structural integrity of these filters due to the relative stiffness of the innermost dense portions of the filter allows the core extenders of this invention to be used therewith without having to extend significantly into the bore of the filter to provide structural support thereto.

In operation, the filtrate would pass from the external surface 64 of the cartridge filter through the filter body and into the longitudinal bore 54. The filtrate would usually then exit from the bore through the interior of the core extender body. The diameter of the longitudinal bore 50 within the core extender need only be sufficiently large to permit efficient flow of the filtrate from the interior of the filter and through the interior of the core extender. Preferably, the diameter of the longitudinal bore will be large enough to provide efficient flow of the filtrate through said bore without causing a substantial structurally weakening of the body of the core extender.

The core extender body may be attached to the end surface 60 of the cartridge filter in any suitable manner. The core extender may be merely inserted and friction fitted provided that the core extender fits tightly enough within the longitudinal bore of the filter to form a seal between the external surface of the core extender body and adjacent surfaces of the cartridge filter. Preferably, the core extender body is sealed to the end surface of the cartridge filter via a non-adhesive means such as induction welding; hot wire or flame melting; etc. Most preferably, the core extender is spin welded to the cartridge filter after formation of the spray-spun filter. Spin welding techniques used to attach bodies to each other (especially thermoplastic bodies) are well known in the art. A discussion of spin welding occurs within the disclosure of U.S. Pat. No. 4,090,898, herein incorporated by reference.

The portion of the core extender body defined by the external surface 28 need only be of sufficient longitudinal dimension so as to provide some structural support for the core extender body as it is inserted into the bore of the cartridge filter. Since the filtrate traverses the filter body radially from the outermost surface towards the innermost portion (i.e., the bore), any substantial extension of the core extender body within said bore will block the radial flow of the filtrate into the bore cavity. For example, for a typical cartridge filter having a length of several inches and an outside diameter of approximately two and one half inches and an inside diameter of approximately one inch, the core extender need generally only be inserted from ⅛ to ½ of an inch in order to provide a sufficient friction fit.

In addition, if the core extender is spin-welded to the end surface of a cartridge filter, the portion of the core extender body to be inserted need only be of such a dimension so as to provide a centering function. If the core extender is to be friction fitted, the portion of the body to be inserted must be long enough to provide the necessary resistance to removal from the filter.

Figure 4:
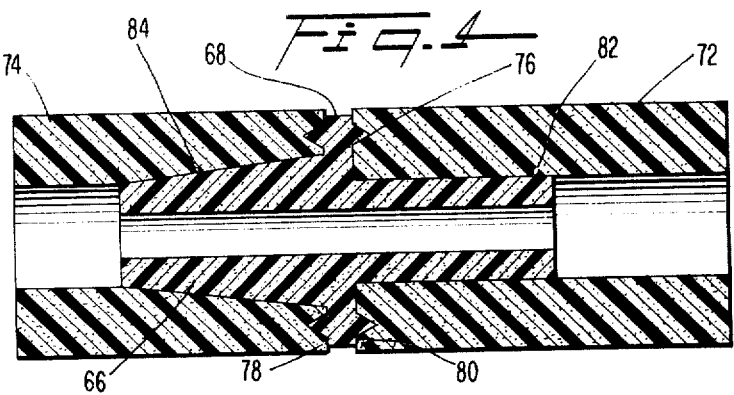
FIG. 4 is a cross-sectional view of another embodiment of the tubular core extender of the present invention in combination with two filter cartridges.

The core extender body 66 of FIG. 4 is similar in design to that disclosed in FIG. 3 except that the radially extending shoulder 68 is in the form of a flange-like member. As depicted, the core extender body 66 is positioned so as to connect two separate cartridge filters 72,74. As a further improvement in the method of providing an effective seal between the filters, each lateral surface 78,80 of the flange-like shoulder 68 is provided with an annular sealing ring 76.

The annular sealing ring will normally have an edge on its outermost periphery that is capable of being pressed into the body of the cartridge filter as the core extender is seated against the end face of the filter. For example, the sealing ring may be triangular in cross-section and situated such that an apex of the triangle extends laterally from the flange-like portion and would be pressed into the body of the cartridge filter.

While FIG. 4 depicts the flange-like shoulder 68 as having annular sealing rings on each lateral surface, an annular sealing ring may be placed only on one side, or not used at all. However, the use of the annular sealing rings effectively prevents the filtrate from bypassing the intended direction of withdrawal from the filtering system. The annular sealing ring may be either an integral part of the body of the core extender or attached thereto prior to being used in combination with cartridge filters.

The annular sealing ring need only extend axially far enough from the lateral surfaces of the flange-like shoulder member so as to provide some deflection of and entry into the body of the cartridge filter as the flange-like shoulder member is pressed against the end face of the filter. If the ring extends too far from the lateral surface it could interfere with the proper seating of a core extender into holes in the ends of the filter housing. Thus the lateral extension of the annular ring and the dimensions of the frustoconical surface of the core extender must be correlated so as to provide for the uninhibited seating of said frusto-conical surface in the bottom of the filter housing if so used.

The flange-like shoulder member 68 may be of any diameter but generally will not exceed the diameter of adjacent cartridge filters. For core extenders which are friction fitted into the cartridge filters, it may be advantageous to employ a core extender whose flange-like shoulder member is of sufficiently large diameter to effectively seal a major proportion of the end surfaces of adjacent cartridge filters. The flange-like shoulder member will normally be of such a diameter so as to inhibit the fluid to be filtered from entering through the filter bore as opposed to the outermost surface thereof.

Figure 5:
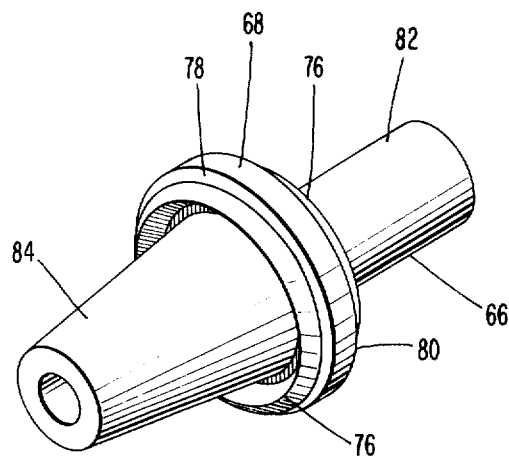
FIG. 5 is a view in perspective of the tubular core extender of FIG. 4.

The core extender body 66 is shown in FIG. 5 having a first cylindrical external surface 82 and a second frustoconical surface 84. The flange-like shoulder 68 is shown together with the sharp-edged annular sealing ring 76.

Figure 6:
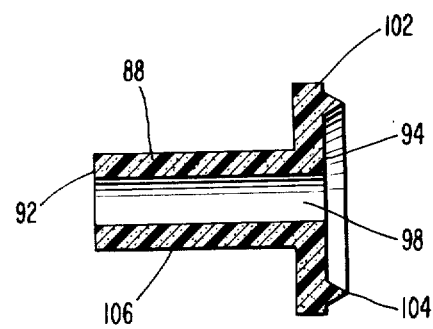
FIG. 6 is a cross-sectional view of another embodiment of the tubular core extender of the present invention.

As depicted in FIG. 6, the core extender body 88 has first and second ends 92,94 with a longitudinal bore 98 connecting the ends. A flange-like shoulder 102 extends radially from the body 88 and is juxtaposed with said second end. An annular sealing ring 104 extends from a lateral surface of said flange-like shoulder 102. While only one annular sealing ring has been depicted, each lateral surface of the flange-like shoulder may be provided with an annular sealing ring. A cylindrical external surface 106 extends between the flange-like shoulder 102 and the first end 92.

As shown in FIG. 7, the core extender body 108 is inseted into the longitudinal bore 112 of a cartridge filter 114. External surface 116 which extends between first and second ends 118 and 120 abuts the interior surface of the longitudinal bore 112 of the filter cartridge. The flange-like shoulder 126 which extends radially from the core extender body is juxtaposed with said second end with one lateral surface thereof abutting the end surface 128 of the cartridge filter. The flange-like shoulder 126 is provided with an annular sealing ring 130 on each lateral surface.

The core extender body 132 shown in FIG. 8 has first and second ends 134,136. A flange-like shoulder 140 extends radially from said body and is juxtaposed with said first end 134. Each lateral surface of the flange-like shoulder 140 is provided with an annular sealing ring 142. An external frustoconical surface 144 extends from said flange-like shoulder to said second end. Longitudinal communication means 146 extends between said first and second ends and is shown as a longitudinal bore within the core extender body and provides for the passage of filtrate therethrough. The first end 134 of said core extender abuts an end surface of the cartridge filter 148, and the annular sealing ring adjacent the end surface is pressed into the body of the filter. The core extender body may be attached to the cartridge filter by any suitable known process such as spin-welding in order to form an integral cartridge filter-core extender combination.

The core extender body 152 of FIG. 9 has first and second ends 154,156. A radially extending shoulder extends from the body between the first and second ends and is depicted as a flange-like shoulder 158 having an annular sealing ring 160 extending from each lateral surface thereof. External cylindrical surfaces 162 and 164 extend from each of said ends to said flange-like shoulder 158. Each of the portions of the core extender body defined by said external surfaces are inserted into the longitudinal bores 166,168 of the filter cartridges which are to be structurally connected. Said portions are of such a diameter so as to provide a tight friction fit between said external surfaces and the cartridge filter bodies.

As depicted in FIG. 10, the inside diameter of the annular sealing ring 172 is greater than the diameter of the longitudinal bore 174 of the cartridge filters, while the outside diameter is less than the outside diameter of the cartridge filter. In this way the ring will effectively provide a seal between cartridge filters 178 and 180, thus preventing the passage of filtrate from the interior of the filter cartridges through the adjacent radial surfaces of abutting cartridges.

While an annular sealing ring is depicted in FIG. 10 having a hexagonal cross-section, any shape will be suitable as long as the peripheral edge of the annular ring is capable of being pressed into the body of a cartridge filter. For example, the cross-sectional shape may also be square or rhomboidal.

The annular sealing ring will normally be attached to the end of a cartridge filter by a spin-welding procedure. In this way cartridge filters may be produced which have an annular sealing ring attached to at least one end. The filters may then be stacked and pressed together end-to-end within a filter housing to provide an effective seal between each of the filters whenever the annular sealing ring is situated between and pressed into adjacent cartridge filters.

Cartridge filter 184 is shown in FIG. 11 in combination with an annular sealing ring 186. The inside diameter of the ring is greater than the diameter of the longitudinal cavity 188 within the cartridge filter.

The core extender and annular sealing ring may be comprised of any non-permeable material which is capable of insertion into the cartridge filter. For example, the core extender and sealing ring may be comprised of various types of thermosetting resins, thermoplastic resins, metals, ceramics, etc. Certainly process considerations such as desired wear characteristics, temperature stability, weight, ease of manufacture and cost of the material will all determine which material will be used.

Generally, however, it is preferred to construct the core extender and sealing ring of the same material as employed in the cartridge filter. For example, typical cartridge filters are constructed of polypropylene and it is therefore advantageous to similarly employ a core extender or sealing ring comprised of polypropylene in order to prevent undesirable contamination of the filtering system with other impurities. It has been found that polypropylene is substantially inert in most filtration systems and causes few, if any, filtrate contamination problems. Polyethylene terephthalate (PET) or a nylon may also be used when the filtration is to occur under high temperatures due to their increased thermal stability.

The core extender and annular sealing ring will advantageously be constructed of a thermoplastic resin if a spin-welding procedure is used to bond the core extender or the annular sealing ring to the body of the cartridge filter.

The integral core extender and sealing means depicted in FIGS. 1-11 may be used as follows. Cartridge filters are conventionally used either singly or in a coaxially stacked assembly.

If used singly, one of the core extenders as shown in FIGS. 1-9 may be used on each end of the cartridge filter. Preferably, a core extender having a frustoconical surface which extends from the end of the filter is employed since the frustoconical surface may then be inserted into and seated within an exit hole in one or more ends of the filter housing. This seating arrangement provides a tight interference fit and further aids in supporting the cartridge filter within the housing. At the conclusion of the filtration process or at the point when the filter becomes overloaded, the cartridge may be removed along with any integrally attached core extenders and both disgarded.

When used in tandem or in a coaxial stacked assembly, each of the cartridge filters would be connected to an adjacent filter by use of the core extender or an annular sealing ring. Preferably, a core extender as depicted in FIG. 4 is employed to connect adjacent filters since some structural integrity is provided by the insertion of the cylindrical and frustoconical surfaces into the respective filters, while the annular sealing ring on the flange-like shoulder seals the facing annular surfaces to prevent filtrate leakages therebetween.

Normally each cartridge filter would have only one of the core extenders inserted therein. Corresponding end surfaces of the filters to be connected would then be matched to provide for insertion of the protruding surfaces of the core extenders into the longitudinal bore thereof.

For example, when using a core extender as depicted in FIG. 4, the cylindrical surface of the core extender would be frictionally attached to or spun-welded to a cartridge filter prior to use in the filter housing. Upon stacking of a plurality of cartridges, an adjacent cartridge would then be seated upon the free frustoconical end of the core extender. In this way, a plurality of cartridge filters may be easily and efficiently connected.

In the alternative, an annular sealing ring may be used to connect adjacent cartridge filters. Normally the annular ring would be attached to the cartridge filter by spin-welding so that an integral combination of the two may be obtained. A core extender body must be used on each end of a stacked coaxial assembly of filters in order to provide for sufficient connection of the interior of the filters to the outlet system of the filter housing.

While the invention has been described in connection with a preferred embodiment thereof, it is to be understood that the present disclosure is illustrative rather than restrictive and further modifications may be resorted to without departing from the spirit of the invention or the scope of the claims.

What is claimed is:

1. In combination with a cartridge filter having a longitudinal bore, a cartridge filter core extender for insertion into the bore, the core extender comprising a core extender body having first and second ends with communication means extending longitudinally through said body between the first and second ends, a shoulder extending generally radially from the body and axially spaced from each end, a first external surface extending between the first end and the shoulder, a second external surface extending between the second end and the shoulder, the diameter of said radially extending shoulder being greater than the diameter of the longitudinal bore of the cartridge filter, said first external surface defining a portion of said core extender which is inserted into the longitudinal bore of the cartridge filter and is of such a dimension so as to prevent the passage of fluid between the external surface of the extender and the body of the filter, the radially extending shoulder being pressed against an end surface of said cartridge filter and said core extender being spin welded to said cartridge filter.

2. The combination of claim 1 wherein the radially extending shoulder of the core extender is a flange.

3. The combination of claim 2 wherein the first external surface is cylindrical.

4. The combination of claim 2 wherein at least one lateral surface of the flange is provided with an annular sealing ring which extends from the at least one surface.

5. The combination of claim 4 wherein the cartridge filter has a uniform density gradient.

6. The combination of claim 4 wherein the first external surface of the core extender is cylindrical.

7. The combination of claim 6 wherein the second external surface of the core extender is cylindrical.

8. The combination of claim 6 wherein the second external surface of the core extender is frustoconical.

* * * * *